(12) United States Patent
Schick et al.

(10) Patent No.: US 11,188,664 B2
(45) Date of Patent: *Nov. 30, 2021

(54) SYSTEMS AND METHODS FOR FACILITATING EDITING OF A CONFIDENTIAL DOCUMENT BY A NON-PRIVILEGED PERSON BY STRIPPING AWAY CONTENT AND MEANING FROM THE DOCUMENT WITHOUT HUMAN INTERVENTION SUCH THAT ONLY STRUCTURAL AND/OR GRAMMATICAL INFORMATION OF THE DOCUMENT ARE CONVEYED TO THE NON-PRIVILEGED PERSON

(71) Applicant: Specifio, Inc., Marina Del Rey, CA (US)

(72) Inventors: Ian C. Schick, Hermosa Beach, CA (US); Kevin Knight, Marina del Rey, CA (US); Jay Priyadarshi, Los Angeles, CA (US); Xing Shi, Playa Vista, CA (US)

(73) Assignee: Specifio, Inc., Marina Del Rey, CA (US)

( * ) Notice: Subject to any disclaimer, the term of this patent is extended or adjusted under 35 U.S.C. 154(b) by 67 days.

This patent is subject to a terminal disclaimer.

(21) Appl. No.: 16/814,335

(22) Filed: Mar. 10, 2020

(65) Prior Publication Data

US 2020/0210603 A1 Jul. 2, 2020

Related U.S. Application Data

(63) Continuation of application No. 15/936,239, filed on Mar. 26, 2018, now Pat. No. 10,621,371.

(Continued)

(51) Int. Cl.
*G06F 21/62* (2013.01)
*G06F 40/166* (2020.01)

(52) U.S. Cl.
CPC ........ *G06F 21/6209* (2013.01); *G06F 40/166* (2020.01)

(58) Field of Classification Search
CPC .......................... G06F 21/6209; G06F 40/166
See application file for complete search history.

(56) References Cited

U.S. PATENT DOCUMENTS 6,014,663 A  1/2000  Rivette
6,049,811 A  4/2000  Petruzzi (Continued)

OTHER PUBLICATIONS

Akihiro Shinmori et al: "Patent claim processing for readability", Patent Corpus Processing, Association for Computational Linguistics, N. Eight Street, Stroudsburg, PA, 18360 07960-1961, USA, Jul. 12, 2003 (Jul. 12, 2003), pp. 56-65, XP058144498, DOI: 10.3115/1119303.1119310, abstract, Sections 1-3.

(Continued)

*Primary Examiner* — Ayoub Alata
(74) *Attorney, Agent, or Firm* — Esplin & Associates, PC

(57) ABSTRACT

Systems and methods for facilitating editing of a confidential document by a non-privileged person by stripping away content and meaning from the document without human intervention such that only structural and/or grammatical information of the document are conveyed to the non-privileged person are disclosed. Exemplary implementations may: receive an electronic document including text conveying one or more confidential concepts; provide a content-stripped version of the electronic document to a human editor; receive an edited content-stripped version of the electronic document; and provide an edited electronic document based on the edited content-stripped version such that human-editor-provided changes were effectuated without (Continued)

the human editor ever being exposed to the content and meaning contained in the electronic document.

16 Claims, 4 Drawing Sheets

Related U.S. Application Data

(60) Provisional application No. 62/590,274, filed on Nov. 23, 2017, provisional application No. 62/479,136, filed on Mar. 30, 2017.

(56) References Cited

U.S. PATENT DOCUMENTS

| | | |
|---|---|---|
| 6,434,580 B1 | 8/2002 | Takano |
| 8,041,739 B2 | 10/2011 | Glasgow |
| 8,843,821 B2 | 9/2014 | Tran |
| 9,195,647 B1 | 11/2015 | Zhang |
| 9,542,360 B2 | 1/2017 | Tran |
| 9,600,566 B2 | 3/2017 | Ganti |
| 9,734,137 B2 * | 8/2017 | Burchett ............ G06F 40/284 |
| 9,836,805 B2 | 12/2017 | Rau |
| 9,906,515 B1 | 2/2018 | Tillman |
| 9,946,895 B1 * | 4/2018 | Kruse ............ G06F 21/6245 |
| 9,990,351 B2 | 6/2018 | Tran |
| 10,242,066 B2 | 3/2019 | Lundberg |
| 10,417,341 B2 | 9/2019 | Schick |
| 10,469,425 B1 * | 11/2019 | Conley ............ H04L 63/0428 |
| 10,572,600 B2 | 2/2020 | Schick |
| 10,747,953 B1 | 8/2020 | Priyadarshi |
| 11,023,662 B2 | 6/2021 | Schick |
| 2001/0049707 A1 | 12/2001 | Tran |
| 2003/0065637 A1 | 4/2003 | Glasgow |
| 2005/0144177 A1 | 6/2005 | Hodes |
| 2005/0210042 A1 | 9/2005 | Goedken |
| 2005/0261891 A1 | 11/2005 | Chan |
| 2006/0190807 A1 | 8/2006 | Tran |
| 2007/0174039 A1 | 7/2007 | Lin |
| 2008/0147656 A1 | 6/2008 | Kahn |
| 2008/0281860 A1 | 11/2008 | Elias |
| 2008/0313528 A1 | 12/2008 | Chang |
| 2010/0257089 A1 | 10/2010 | Johnson |
| 2010/0325716 A1 * | 12/2010 | Hong ............ G06F 21/34 726/9 |
| 2011/0184727 A1 | 7/2011 | Connor |
| 2011/0246438 A1 | 10/2011 | Sathish |
| 2012/0101803 A1 | 4/2012 | Popov |
| 2012/0101804 A1 | 4/2012 | Roth |
| 2012/0251016 A1 | 10/2012 | Lyons |
| 2012/0296835 A1 | 11/2012 | Khan K |
| 2013/0282599 A1 | 10/2013 | Kang |
| 2014/0180934 A1 | 6/2014 | Surdeanu |
| 2014/0249801 A1 | 9/2014 | Jackson |
| 2015/0278810 A1 * | 10/2015 | Ramatchandirane .. G06Q 20/30 705/16 |
| 2016/0048936 A1 | 2/2016 | Perkowski |
| 2016/0232246 A1 | 8/2016 | Rau |
| 2016/0350886 A1 | 12/2016 | Jessen |
| 2017/0039174 A1 | 2/2017 | Strope |
| 2017/0185591 A1 | 6/2017 | Tetreault |
| 2017/0185921 A1 | 6/2017 | Zhang |
| 2018/0018564 A1 | 1/2018 | Erenrich |
| 2018/0108014 A1 * | 4/2018 | Williams ............ G06Q 20/409 |
| 2018/0113934 A1 | 4/2018 | Jablonski |
| 2018/0121419 A1 | 5/2018 | Lee |
| 2018/0232361 A1 | 8/2018 | Schick |
| 2018/0308003 A1 | 10/2018 | Singh |
| 2018/0329883 A1 | 11/2018 | Leidner |
| 2018/0357800 A1 | 12/2018 | Oxholm |
| 2019/0005707 A1 | 1/2019 | Yamada |
| 2019/0034416 A1 | 1/2019 | Al Hasan |
| 2019/0332674 A1 | 10/2019 | Schick |
| 2020/0151393 A1 | 5/2020 | Schick |
| 2020/0234000 A1 | 7/2020 | Schick |

OTHER PUBLICATIONS

International Search Report and Written Opinion, PCT Application No. PCT/US2018/018257, dated May 17, 2018, 15 pages.

Nadjet Bouayad-Agha et al: "Improving the comprehension of legal documentation", Artificial Intelligence and Law, ACM, 2, Penn Plaza, Suite 701 New York NY, 10121-0701 USA, Jun. 8, 2009 (Jun. 8, 2009), pp. 78-87, XP058361680, DOI: 10.1145/1568234. 1568244; ISBN: 978-1-60558-597-0 abstract Sections 2-4; figures 1, 2.

Svetlana Sheremetyeva: "Natural language analysis of patent claims", Patent Corpus Processing, Association for Computational Linguistics, N. Eight Street, Stroudsburg, PA, 18360 07960-1961, USA, Jul. 12, 2003 (Jul. 12, 2003), pp. 66-73, XP058144499, DOI: 10.3115/ 1119303.1119311, abstract, Sections 1-4.

Tseng, Y. H., Lin, C. J., & Lin, Y. I. (2007). Text mining techniques for patent analysis. Information Processing & Management, 43(5), 1216-1247.

Bouayad-Agha, N., Casamayor, G., Ferraro, G., Mille, S., Vidal, V., & Wanner, L. (Jun. 2009). Improving the comprehension of legal documentation: the case of patent claims. In Proceedings of the 12th International Conference on Artificial Intelligence and Law (pp. 78-87). (Year: 2009).

Jhamtani, H., Gangal, V., Hovy, E., & Nyberg, E. (2017). Shakespearizing modern language using copy-enriched sequence-to-sequence models. arXiv preprint arXiv:1707.01161) (Year: 2017) 10 pages.

S. H. H. Ding, B. C. M. Fung, F. Iqbal and W. K. Cheung, "Learning Stylometric Representations for Authorship Analysis," in IEEE Transactions on Cybernetics, vol. 49, No. 1, pp. 107-121, Jan. 2019 (Year: 2019).

* cited by examiner

SYSTEMS AND METHODS FOR FACILITATING EDITING OF A CONFIDENTIAL DOCUMENT BY A NON-PRIVILEGED PERSON BY STRIPPING AWAY CONTENT AND MEANING FROM THE DOCUMENT WITHOUT HUMAN INTERVENTION SUCH THAT ONLY STRUCTURAL AND/OR GRAMMATICAL INFORMATION OF THE DOCUMENT ARE CONVEYED TO THE NON-PRIVILEGED PERSON

FIELD OF THE DISCLOSURE

The present disclosure relates to systems and methods for facilitating editing of a confidential document by a non-privileged person by stripping away content and meaning from the document without human intervention such that only structural and/or grammatical information of the document are conveyed to the non-privileged person.

BACKGROUND

In certain fields, such as legal, financial, and medical, there is often an obligation or duty to maintain confidentiality. This confidentiality requirement can limit how third parties aid professionals working in these areas. For example, a legal professional may be unable to seek assistance from a non-privileged third party with preparing a document that contains confidential client information.

SUMMARY

One aspect of the present disclosure relates to a system configured for facilitating review of a confidential document by a non-privileged person by stripping away content and meaning from the document without human intervention such that only structural and/or grammatical information of the document are conveyed to the non-privileged person. The system may include one or more hardware processors configured by machine-readable instructions. The processor(s) may be configured to receive, at a processor, an electronic document including text conveying confidential information. The text may include a plurality of words including a first word. The processor(s) may be configured to tokenize the text of the electric document by breaking up a stream of the text into tokens, a given token being a word or a punctuation. The processor(s) may be configured to determine whether individual words are content words, a given content word having a substantive meaning. The processor(s) may be configured to determine whether individual words are function words, a given function word lacking substantive meaning and instead denoting grammatical relationships between content words. The processor(s) may be configured to, responsive to a determination that the first word is a function word, leave the first word intact. The processor(s) may be configured to, responsive to a determination that the first word is a content word, substitute the first word with a symbol such that a meaning of the first word cannot be obtained from the symbol.

Another aspect of the present disclosure relates to a method for facilitating review of a confidential document by a non-privileged person by stripping away content and meaning from the document without human intervention such that only structural and/or grammatical information of the document are conveyed to the non-privileged person. The method may include receiving, at a processor, an electronic document including text conveying confidential information. The text may include a plurality of words including a first word. The method may include tokenizing the text of the electric document by breaking up a stream of the text into tokens, a given token being a word or a punctuation. The method may include determining whether individual words are content words, a given content word having a substantive meaning. The method may include determining whether individual words are function words, a given function word lacking substantive meaning and instead denoting grammatical relationships between content words. The method may include, responsive to a determination that the first word is a function word, leaving the first word intact. The method may include, responsive to a determination that the first word is a content word, substituting the first word with a symbol such that a meaning of the first word cannot be obtained from the symbol.

Yet another aspect of the present disclosure relates to a system configured for facilitating editing of a confidential document by a non-privileged person by stripping away content and meaning from the document without human intervention such that only structural and/or grammatical information of the document are conveyed to the non-privileged person. The system may include one or more hardware processors configured by machine-readable instructions. The processor(s) may be configured to receive an electronic document including text conveying one or more confidential concepts. The text may include a plurality of words including a first word. The processor(s) may be configured to tokenize the text of the electronic document by breaking up a stream of the text into tokens, a given token being a word, a phrase, a symbol, or a punctuation. The processor(s) may be configured to determine whether individual words are content words, a given content word having a substantive meaning. The processor(s) may be configured to determine whether individual words are function words, a given function word lacking substantive meaning and instead denoting grammatical relationships between content words. The processor(s) may be configured to determine whether individual words are nonce words, a given nonce word facially suggesting structure but, in fact, describing function. The processor(s) may be configured to, responsive to a determination that the first word is a function word, leave the first word intact. The processor(s) may be configured to, responsive to a determination that the first word is a nonce word, leave the first word intact. The processor(s) may be configured to, responsive to a determination that the first word is a content word, substitute the first word with a symbol such that a meaning of the first word cannot be obtained from the symbol. The processor(s) may be configured to provide a content-stripped version of the electronic document to a human editor. The content-stripped version may include symbols substituted for content words such that content and meaning is stripped away from the document. The content and meaning may be stripped away without human intervention such that only structural and/or grammatical information of the document are conveyed to the human editor. The processor(s) may be configured to receive an edited content-stripped version of the electronic document. The edited version may include changes to the content-stripped version made by the human editor. The processor(s) may be configured to provide an edited electronic document based on the edited content-stripped version such that human-editor-provided changes were effectuated without the human editor ever being exposed to the content and meaning contained in the electronic document.

Still another aspect of the present disclosure relates to a method for facilitating editing of a confidential document by a non-privileged person by stripping away content and meaning from the document without human intervention such that only structural and/or grammatical information of the document are conveyed to the non-privileged person. The method may include receiving an electronic document including text conveying one or more confidential concepts. The text may include a plurality of words including a first word. The method may include tokenizing the text of the electronic document by breaking up a stream of the text into tokens, a given token being a word, a phrase, a symbol, or a punctuation. The method may include determining whether individual words are content words, a given content word having a substantive meaning. The method may include determining whether individual words are function words, a given function word lacking substantive meaning and instead denoting grammatical relationships between content words. The method may include determining whether individual words are nonce words, a given nonce word facially suggesting structure but, in fact, describing function. The method may include, responsive to a determination that the first word is a function word, leaving the first word intact. The method may include, responsive to a determination that the first word is a nonce word, leaving the first word intact. The method may include, responsive to a determination that the first word is a content word, substituting the first word with a symbol such that a meaning of the first word cannot be obtained from the symbol. The method may include providing a content-stripped version of the electronic document to a human editor. The content-stripped version may include symbols substituted for content words such that content and meaning is stripped away from the document. The content and meaning may be stripped away without human intervention such that only structural and/or grammatical information of the document are conveyed to the human editor. The method may include receiving an edited content-stripped version of the electronic document. The edited version may include changes to the content-stripped version made by the human editor. The method may include providing an edited electronic document based on the edited content-stripped version such that human-editor-provided changes were effectuated without the human editor ever being exposed to the content and meaning contained in the electronic document.

Even another aspect of the present disclosure relates to a non-transient computer-readable storage medium having instructions embodied thereon, the instructions being executable by one or more processors to perform a method for facilitating editing of a confidential document by a non-privileged person by stripping away content and meaning from the document without human intervention such that only structural and/or grammatical information of the document are conveyed to the non-privileged person. The method may include receiving an electronic document including text conveying one or more confidential concepts. The text may include a plurality of words including a first word. The method may include tokenizing the text of the electronic document by breaking up a stream of the text into tokens, a given token being a word, a phrase, a symbol, or a punctuation. The method may include determining whether individual words are content words, a given content word having a substantive meaning. The method may include determining whether individual words are function words, a given function word lacking substantive meaning and instead denoting grammatical relationships between content words. The method may include determining whether individual words are nonce words, a given nonce word facially suggesting structure but, in fact, describing function. The method may include, responsive to a determination that the first word is a function word, leaving the first word intact. The method may include, responsive to a determination that the first word is a nonce word, leaving the first word intact. The method may include, responsive to a determination that the first word is a content word, substituting the first word with a symbol such that a meaning of the first word cannot be obtained from the symbol. The method may include providing a content-stripped version of the electronic document to a human editor. The content-stripped version may include symbols substituted for content words such that content and meaning is stripped away from the document. The content and meaning may be stripped away without human intervention such that only structural and/or grammatical information of the document are conveyed to the human editor. The method may include receiving an edited content-stripped version of the electronic document. The edited version may include changes to the content-stripped version made by the human editor. The method may include providing an edited electronic document based on the edited content-stripped version such that human-editor-provided changes were effectuated without the human editor ever being exposed to the content and meaning contained in the electronic document.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
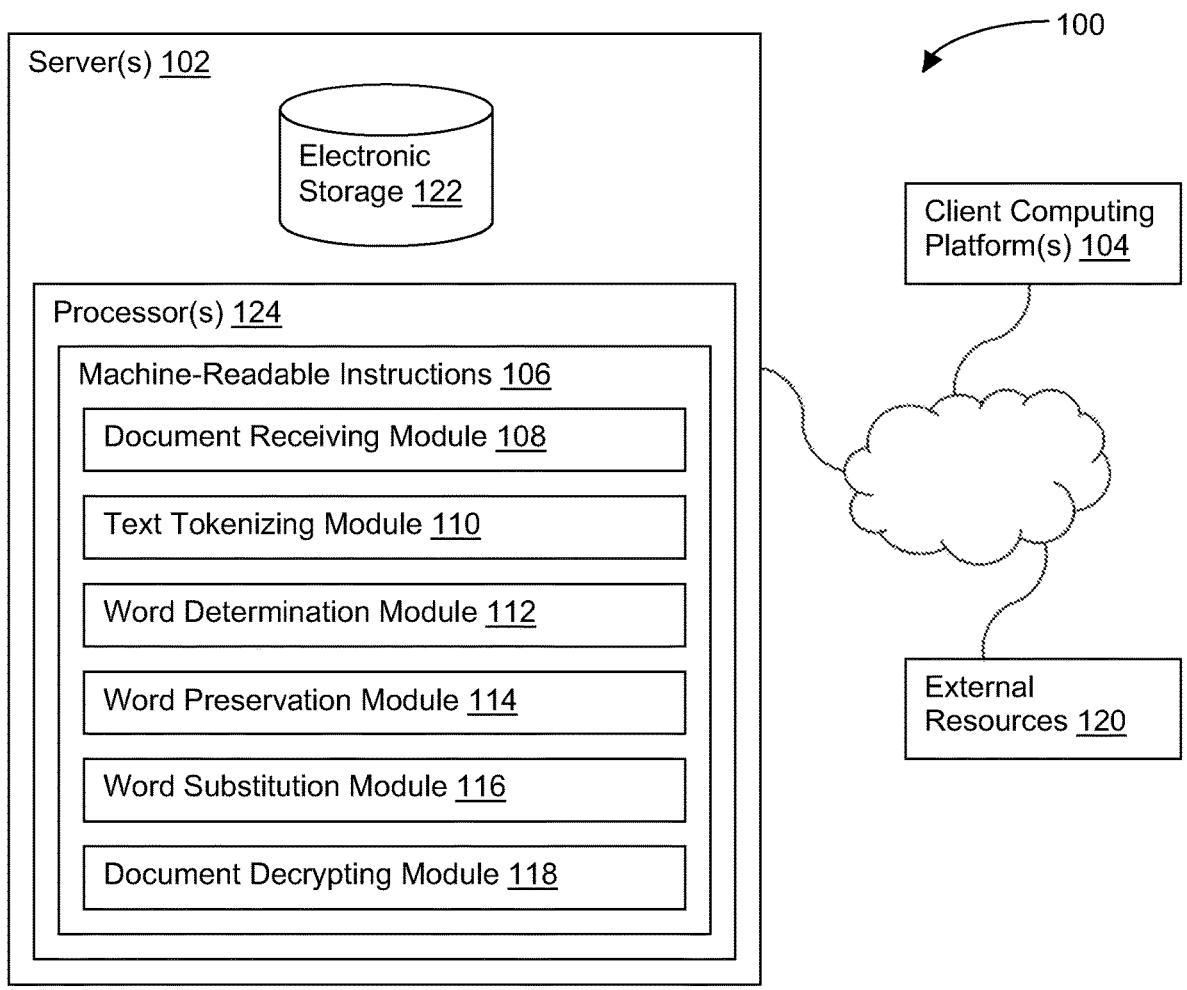
FIG. 1 illustrates a system configured for facilitating review of a confidential document by a non-privileged person by stripping away content and meaning from the document without human intervention such that only structural and/or grammatical information of the document are conveyed to the non-privileged person, in accordance with one or more implementations.
Figure 2:
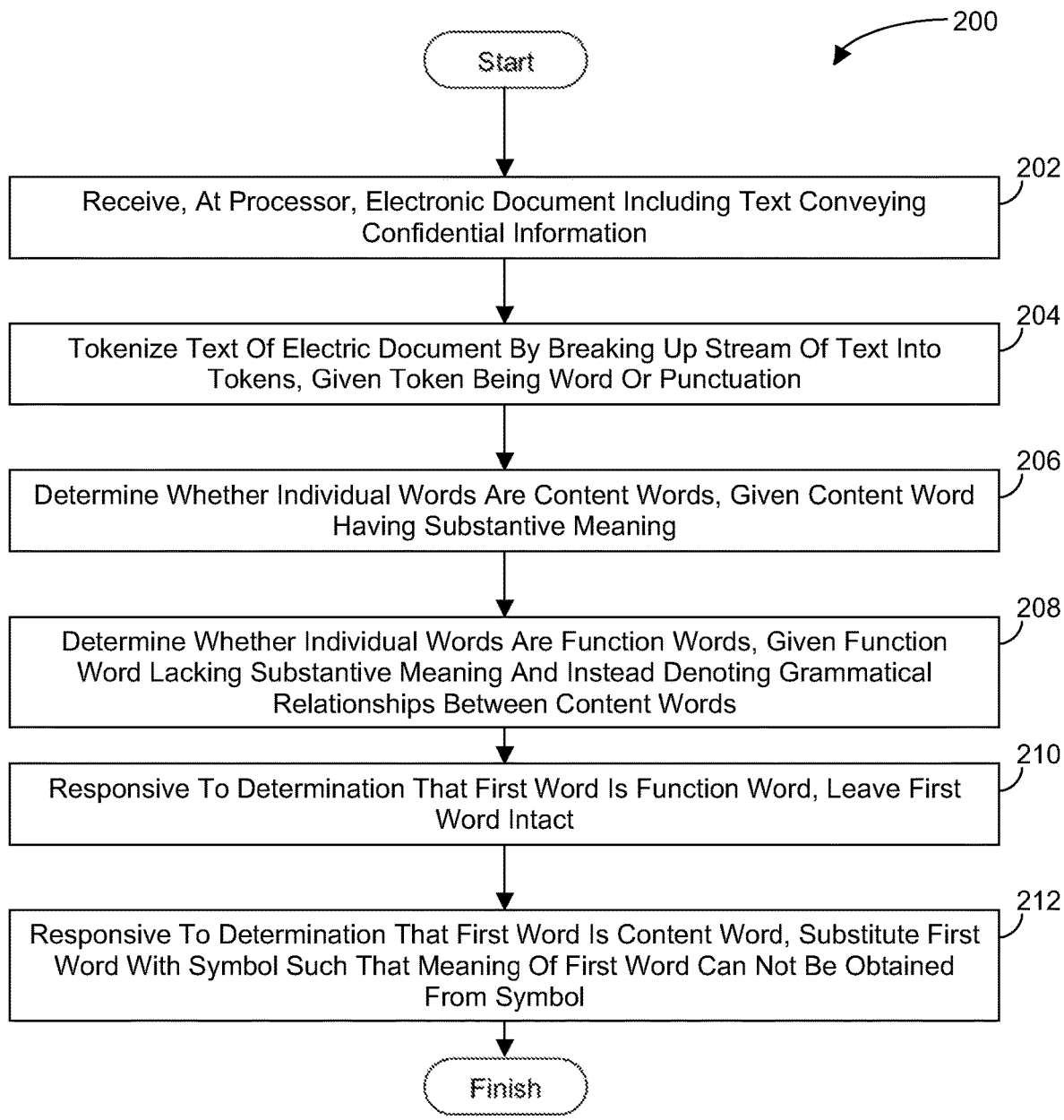
FIG. 2 illustrates a method for facilitating review of a confidential document by a non-privileged person by stripping away content and meaning from the document without human intervention such that only structural and/or grammatical information of the document are conveyed to the non-privileged person, in accordance with one or more implementations.

FIG. 1 illustrates a system 100 configured for facilitating review of a confidential document by a non-privileged person by stripping away content and meaning from the document without human intervention such that only structural and/or grammatical information of the document are conveyed to the non-privileged person, in accordance with one or more implementations. Obscured content-stripped versions of confidential documents may be used to analyze document structures, word forms, and/or other aspects of the underlying confidential documents.

In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction modules. The instruction modules may include computer program modules. The instruction modules may include one or more of a document receiving module 108, a text tokenizing module 110, a word determination module 112, a word preservation module 114, a word substitution module 116, a document decrypting module 118, and/or other instruction modules.

Document receiving module 108 may be configured to receive, at a processor, an electronic document including text conveying confidential information. The confidential information may be inaccessible to any non-privileged persons. A given non-privileged person may be a person who is not affiliated in a confidential relation underlying the confidentiality of the information conveyed by the electronic document. By way of non-limiting example, the confidential relation may include an attorney and client, a husband and wife, a physician and patient, or a master and servant. The electronic document may be password protected. The electronic document may be encrypted. The text may include a plurality of words including a first word.

Text tokenizing module 110 may be configured to tokenize the text of the electric document by breaking up a stream of the text into tokens. A given token may be a word or a punctuation.

Word determination module 112 may be configured to determine whether individual words are content words. A given content word may have a substantive meaning. Determining whether the first word may have a substantive meaning includes determining a part of speech of the first word. By way of non-limiting example, the content words may include nouns, verbs, adjectives, and some adverbs. The part of speech of the first word may be determined based on a parse of a portion of the text. Determining whether the first word may have a substantive meaning includes determining whether the first word is not a function word and not a nonce word.

Word determination module 112 may be configured to determine whether individual words are function words. A given function word may lack substantive meaning and instead denote grammatical relationships between content words. In some implementations, by way of non-limiting example, a given function word may include pronouns, conjunctions, prepositions, auxiliary verbs, and some adverbs. Determining whether the first word may be a function word may include determining whether the first word is included in a discrete list of function words.

Word determination module 112 may be configured to determine whether individual words are nonce words. A given nonce word may facially suggest structure but, in fact, describes function. In some implementations, by way of non-limiting example, a given nonce word may include mechanism, element, device, module, component, means, processor, unit, member, apparatus, machine, system, appliance, base, body, configuration, container, enclosure, function, housing, medium, platform, receptacle, or claim. Determining whether the first word is a nonce word may include determining whether the first word is included in a discrete list of nonce words. The discrete list of nonce words may be related to a specific domain.

Word preservation module 114 may be configured to, responsive to a determination that the first word is a function word, leave the first word intact.

Word preservation module 114 may be configured to, responsive to a determination that the first word is a nonce word, leave the first word intact.

Word substitution module 116 may be configured to, responsive to a determination that the first word is a content word, substitute the first word with a symbol such that a meaning of the first word cannot be obtained from the symbol. Some or all content words in the text may be substituted with different corresponding symbols.

In some implementations, the symbol may be alphanumeric. In some implementations, the symbol may include one or more non-alphanumeric characters. In some implementations, by way of non-limiting example, a given non-alphanumeric character may include a dash, an underscore, an asterisk, or an ampersand. In some implementations, the symbol may include a numeric portion. In some implementations, the numeric portion of the symbol may be a random number. A first character of the symbol may be the same as a first character of the first word. A last character of the symbol may be the same as a last character of the first word. A suffix of the symbol may be the same as a suffix of the first word. The symbol may convey a part of speech of the first word. The part of speech may be conveyed by a Penn treebank constituent tag. The symbol may convey a length of the first word. The symbol may be the same length as the first word. The symbol may be substituted for every instance of the first word in the text. The correlation between the symbol and the first word may be unique to the electric document such that instances of the first word in other electronic documents have different corresponding symbols. The numeric portion of the symbol may be determined based on an order of appearance of the first word in the text.

According to some implementations, after its content is stripped, the following paragraph:

> The present disclosure relates to systems and methods for facilitating review of a confidential document by a non-privileged person by stripping away content and meaning from the document without human intervention such that only structural and/or grammatical information of the document are conveyed to the non-privileged person may look something like this:

> the p0018 d0017 r0019s to systems and methods for f0000ing r0001 of a c0002 d0003 by a n0004 p0005 by s0006ing a0007 c0008 and m0009 from the d0003 without h0010 i0011 such that only s0012 and/or g0013 i0014 of the d0003 are c0015ed to the n0004 p0005.

Document decrypting module 118 may be configured to decrypt the document without human intervention.

In some implementations, server(s) 102, client computing platform(s) 104, and/or external resources 120 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 120 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 120, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 120 may include sources of information outside of system 100, external entities participating with system 100, and/or other resources. In some implementations, some or all of the functionality attributed herein to external resources 120 may be provided by resources included in system 100.

Server(s) 102 may include electronic storage 122, one or more processors 124, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may comprise non-transitory storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. Processor(s) 124 may be configured to execute modules 108, 110, 112, 114, 116, 118, and/or other modules. Processor(s) 124 may be configured to execute modules 108, 110, 112, 114, 116, 118, and/or other modules by software; hardware; firmware; some combination of software, hardware, and/or firmware; and/or other mechanisms for configuring processing capabilities on processor(s) 124. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 116, and 118 are illustrated in FIG. 1 as being implemented within a single processing unit, in implementations in which processor(s) 124 includes multiple processing units, one or more of modules 108, 110, 112, 114, 116, and/or 118 may be implemented remotely from the other modules. The description of the functionality provided by the different modules 108, 110, 112, 114, 116, and/or 118 described below is for illustrative purposes, and is not intended to be limiting, as any of modules 108, 110, 112, 114, 116, and/or 118 may provide more or less functionality than is described. For example, one or more of modules 108, 110, 112, 114, 116, and/or 118 may be eliminated, and some or all of its functionality may be provided by other ones of modules 108, 110, 112, 114, 116, and/or 118. As another example, processor(s) 124 may be configured to execute one or more additional modules that may perform some or all of the functionality attributed below to one of modules 108, 110, 112, 114, 116, and/or 118.

FIG. 2 illustrates a method 200 for facilitating review of a confidential document by a non-privileged person by stripping away content and meaning from the document without human intervention such that only structural and/or grammatical information of the document are conveyed to the non-privileged person, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include receiving, at a processor, an electronic document including text conveying confidential information. The text may include a plurality of words including a first word. Operation 202 may be performed by one or more hardware processors configured by machine-readable instructions including a module that is the same as or similar to document receiving module 108, in accordance with one or more implementations.

An operation 204 may include tokenizing the text of the electric document by breaking up a stream of the text into tokens, a given token being a word or a punctuation. Operation 204 may be performed by one or more hardware processors configured by machine-readable instructions including a module that is the same as or similar to text tokenizing module 110, in accordance with one or more implementations.

An operation 206 may include determining whether individual words are content words, a given content word having a substantive meaning. Operation 206 may be performed by one or more hardware processors configured by machine-readable instructions including a module that is the same as or similar to word determination module 112, in accordance with one or more implementations.

An operation 208 may include determining whether individual words are function words, a given function word lacking substantive meaning and instead denoting grammatical relationships between content words. Operation 208 may be performed by one or more hardware processors configured by machine-readable instructions including a module that is the same as or similar to word determination module 112, in accordance with one or more implementations.

An operation 210 may include, responsive to a determination that the first word is a function word, leaving the first word intact. Operation 210 may be performed by one or more hardware processors configured by machine-readable instructions including a module that is the same as or similar to word preservation module 114, in accordance with one or more implementations.

An operation 212 may include, responsive to a determination that the first word is a content word, substituting the first word with a symbol such that a meaning of the first word cannot be obtained from the symbol. Operation 212 may be performed by one or more hardware processors configured by machine-readable instructions including a module that is the same as or similar to word substitution module 116, in accordance with one or more implementations.

Figure 3:
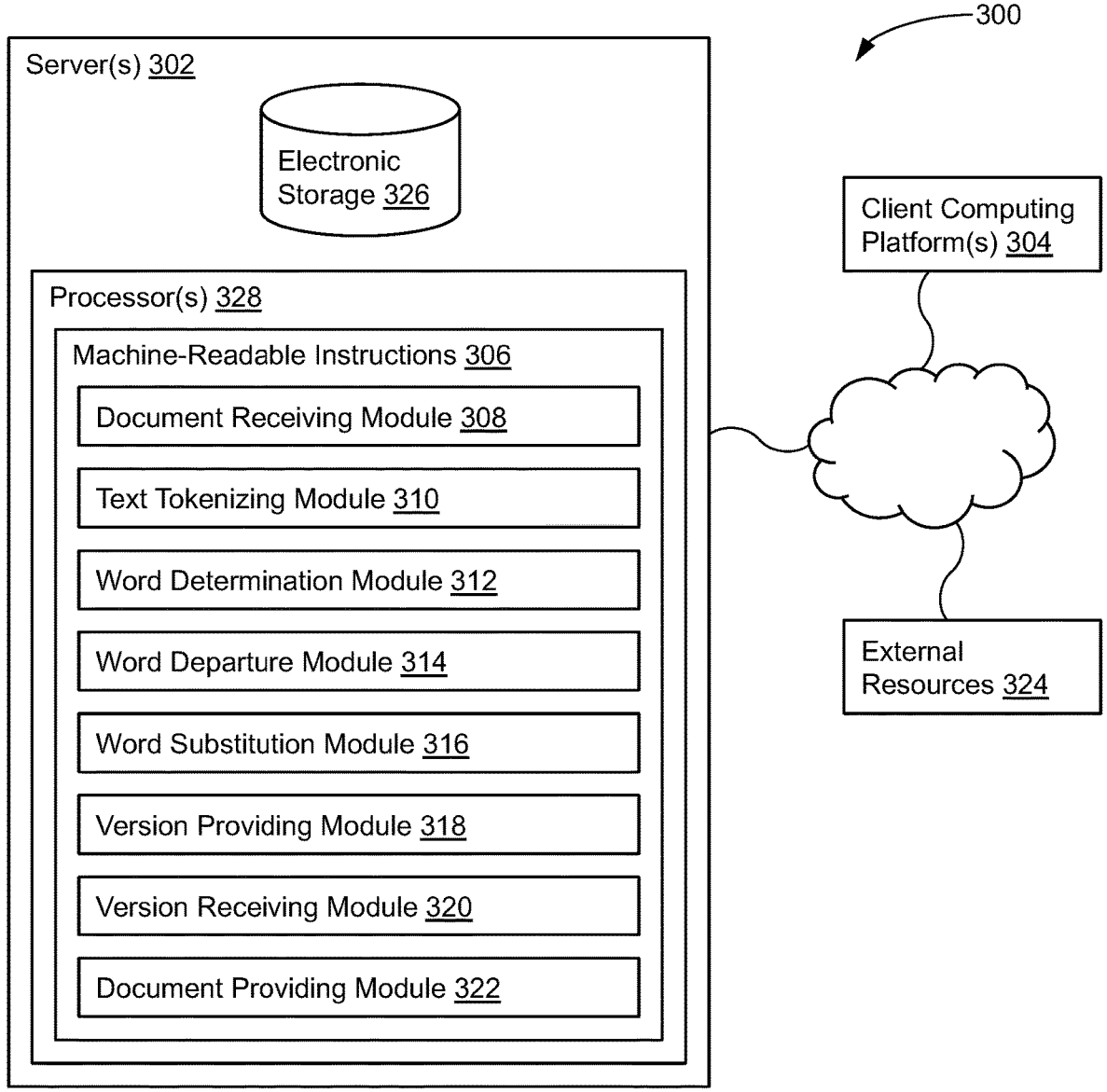
FIG. 3 illustrates a system configured for facilitating editing of a confidential document by a non-privileged person by stripping away content and meaning from the document without human intervention such that only structural and/or grammatical information of the document are conveyed to the non-privileged person, in accordance with one or more implementations.

FIG. 3 illustrates a system 300 configured for facilitating editing of a confidential document by a non-privileged person by stripping away content and meaning from the document without human intervention such that only structural and/or grammatical information of the document are conveyed to the non-privileged person, in accordance with one or more implementations. In some implementations, system 300 may include one or more servers 302. Server(s) 302 may be configured to communicate with one or more client computing platforms 304 according to a client/server architecture and/or other architectures. Client computing platform(s) 304 may be configured to communicate with other client computing platforms via server(s) 302 and/or according to a peer-to-peer architecture and/or other architectures. Users may access system 300 via client computing platform(s) 304.

Server(s) 302 may be configured by machine-readable instructions 306. Machine-readable instructions 306 may include one or more instruction modules. The instruction modules may include computer program modules. The instruction modules may include one or more of a document receiving module 308, a text tokenizing module 310, a word determination module 312, a word departure module 314, a word substitution module 316, a version providing module 318, a version receiving module 320, a document providing module 322, and/or other instruction modules.

Document receiving module 308 may be configured to receive an electronic document including text conveying one or more confidential concepts. The electronic document may be password protected. All content words in the text may be substituted with different corresponding symbols. The text may include a plurality of words including a first word. Determining whether the first word may have a substantive meaning includes determining a part of speech of the first word.

Determining the part of speech of the first word may be based on a parse of a portion of the text. Determining whether the first word may have a substantive meaning includes determining whether the first word is not a function word and not a nonce word. Determining whether the first word may be a function word includes determining whether the first word is included in a discrete list of function words. Determining whether the first word may be a nonce word includes determining whether the first word is included in a discrete list of nonce words.

Text tokenizing module 310 may be configured to tokenize the text of the electronic document by breaking up a stream of the text into tokens, a given token being a word, a phrase, a symbol, or a punctuation. The symbol may be alphanumeric. A first character of the symbol may be the same as a first character of the first word. A last character of the symbol may be the same as a last character of the first word. A suffix of the symbol may be the same as a suffix of the first word.

The symbol may convey a part of speech of the first word. The symbol may include a Penn treebank constituent tag. The symbol may convey a length of the first word. The symbol may be the same length as the first word. The symbol may be substituted for every instance of the first word in the text. The correlation between the symbol and the first word may be unique to the electronic document such that instances of the first word in other electronic documents have different corresponding symbols.

The symbol may include a numeric portion. The numeric portion of the symbol may be determined based on an order of appearance of the first word in the text. The numeric portion of the symbol may be a random number.

Word determination module 312 may be configured to determine whether individual words are content words, a given content word having a substantive meaning.

Word determination module 312 may be configured to determine whether individual words are function words, a given function word lacking substantive meaning and instead denoting grammatical relationships between content words.

Word determination module 312 may be configured to determine whether individual words are nonce words, a given nonce word facially suggesting structure but, in fact, describing function.

Word departure module 314 may be configured to, responsive to a determination that the first word is a function word, leave the first word intact.

Word departure module 314 may be configured to, responsive to a determination that the first word is a nonce word, leave the first word intact.

Word substitution module 316 may be configured to, responsive to a determination that the first word is a content word, substitute the first word with a symbol such that a meaning of the first word cannot be obtained from the symbol.

Version providing module 318 may be configured to provide a content-stripped version of the electronic document to a human editor. The human editor may be replaced by a computer-based artificial editor. The content-stripped version may include symbols substituted for content words such that content and meaning is stripped away from the document. The content and meaning may be stripped away without human intervention such that only structural and/or grammatical information of the document are conveyed to the human editor.

Version receiving module 320 may be configured to receive an edited content-stripped version of the electronic document. The edited version may include changes to the content-stripped version made by the human editor. By way of non-limiting example, the changes may include one or more of a deletion of text, an insertion of text, a modification of text, a deletion of a word, an insertion of a word, a modification of a word, a deletion of a punctuation mark, an insertion of a punctuation, a modification of a punctuation, transposition of two words, insertion or deletion of non-printable characters, modification of font or size, modification of textual features, modification of patent claim numbering, modification of patent claim reference numbering, and/or other changes. By way of non-limiting example, the non-printable characters may include one or more of a line break, a page break, a horizontal tab, a vertical tab, a soft hyphen, a null character, a carriage return, and/or other non-printable characters. By way of non-limiting example, the textual features may include one or more of bold, italic, superscript, subscript, and/or other textual features.

The changes may include deletion of hidden characters in Microsoft Word. The changes may be tracked using a track-changes feature of a word processing document. The word processing document may include a Microsoft Word document.

Document providing module 322 may be configured to provide an edited electronic document based on the edited content-stripped version such that human-editor-provided changes were effectuated without the human editor ever being exposed to the content and meaning contained in the electronic document. Providing the edited electronic document may include making changes to the electronic document based on the changes included in the edited content-stripped version of the electronic document. Providing the edited electronic document may include string difference skipping over the words and symbols in the unedited version or the edited content-stripped version of the electronic document. Providing the edited electronic document may include based on tracked-changes in the edited content-stripped version of the electronic document. Providing the edited electronic document may include temporarily storing, in memory, the content words and corresponding symbols such that the symbols in the edited content-stripped version can be replaced with the corresponding content words to provide the edited electronic document.

In some implementations, by way of non-limiting example, a given content word may include nouns, verbs, adjectives and some adverbs. In some implementations, by way of non-limiting example, a given function word may include pronouns, conjunctions, prepositions, auxiliary verbs, and some adverbs. In some implementations, by way of non-limiting example, a given nonce word may include mechanism, element, device, module, component, means, processor, unit, member, apparatus, machine, system, appliance, base, body, configuration, container, enclosure, function, housing, medium, platform, receptacle, or claim.

In some implementations, server(s) 302, client computing platform(s) 304, and/or external resources 324 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 302, client computing platform(s) 304, and/or external resources 324 may be operatively linked via some other communication media.

A given client computing platform 304 may include one or more processors configured to execute computer program modules. The computer program modules may be configured to enable an expert or user associated with the given client computing platform 304 to interface with system 300 and/or external resources 324, and/or provide other functionality attributed herein to client computing platform(s) 304. By way of non-limiting example, the given client computing platform 304 may include one or more of a desktop computer, a laptop computer, a handheld computer, a tablet computing platform, a NetBook, a Smartphone, a gaming console, and/or other computing platforms.

External resources 324 may include sources of information outside of system 300, external entities participating with system 300, and/or other resources. In some implementations, some or all of the functionality attributed herein to external resources 324 may be provided by resources included in system 300.

Server(s) 302 may include electronic storage 326, one or more processors 328, and/or other components. Server(s) 302 may include communication lines, or ports to enable the exchange of information with a network and/or other computing platforms. Illustration of server(s) 302 in FIG. 3 is not intended to be limiting. Server(s) 302 may include a plurality of hardware, software, and/or firmware components operating together to provide the functionality attributed herein to server(s) 302. For example, server(s) 302 may be implemented by a cloud of computing platforms operating together as server(s) 302.

Electronic storage 326 may comprise non-transitory storage media that electronically stores information. The electronic storage media of electronic storage 326 may include one or both of system storage that is provided integrally (i.e., substantially non-removable) with server(s) 302 and/or removable storage that is removably connectable to server(s) 302 via, for example, a port (e.g., a USB port, a firewire port, etc.) or a drive (e.g., a disk drive, etc.). Electronic storage 326 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 326 may include one or more virtual storage resources (e.g., cloud storage, a virtual private network, and/or other virtual storage resources). Electronic storage 326 may store software algorithms, information determined by processor(s) 328, information received from server(s) 302, information received from client computing platform(s) 304, and/or other information that enables server(s) 302 to function as described herein.

Processor(s) 328 may be configured to provide information processing capabilities in server(s) 302. As such, processor(s) 328 may include one or more of a digital processor, an analog processor, a digital circuit designed to process information, an analog circuit designed to process information, a state machine, and/or other mechanisms for electronically processing information. Although processor(s) 328 is shown in FIG. 3 as a single entity, this is for illustrative purposes only. In some implementations, processor(s) 328 may include a plurality of processing units. These processing units may be physically located within the same device, or processor(s) 328 may represent processing functionality of a plurality of devices operating in coordination. Processor(s) 328 may be configured to execute modules 308, 310, 312, 314, 316, 318, 320, 322, and/or other modules. Processor(s) 328 may be configured to execute modules 308, 310, 312, 314, 316, 318, 320, 322, and/or other modules by software; hardware; firmware; some combination of software, hardware, and/or firmware; and/or other mechanisms for configuring processing capabilities on processor(s) 328. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 308, 310, 312, 314, 316, 318, 320, and 322 are illustrated in FIG. 3 as being implemented within a single processing unit, in implementations in which processor(s) 328 includes multiple processing units, one or more of modules 308, 310, 312, 314, 316, 318, 320, and/or 322 may be implemented remotely from the other modules. The description of the functionality provided by the different modules 308, 310, 312, 314, 316, 318, 320, and/or 322 described below is for illustrative purposes, and is not intended to be limiting, as any of modules 308, 310, 312, 314, 316, 318, 320, and/or 322 may provide more or less functionality than is described. For example, one or more of modules 308, 310, 312, 314, 316, 318, 320, and/or 322 may be eliminated, and some or all of its functionality may be provided by other ones of modules 308, 310, 312, 314, 316, 318, 320, and/or 322. As another example, processor(s) 328 may be configured to execute one or more additional modules that may perform some or all of the functionality attributed below to one of modules 308, 310, 312, 314, 316, 318, 320, and/or 322.

Figure 4:
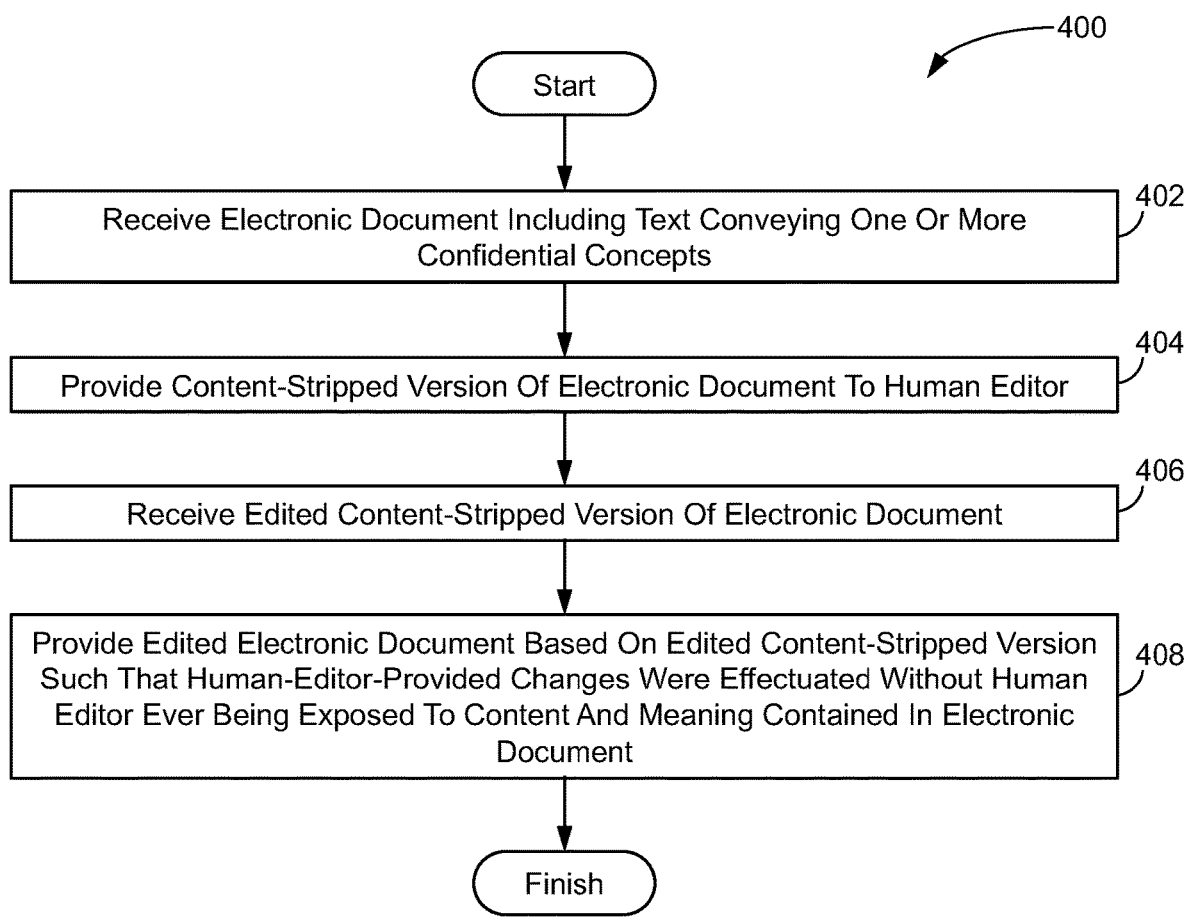
FIG. 4 illustrates a method for facilitating editing of a confidential document by a non-privileged person by stripping away content and meaning from the document without human intervention such that only structural and/or grammatical information of the document are conveyed to the non-privileged person, in accordance with one or more implementations.

FIG. 4 illustrates a method 400 for facilitating editing of a confidential document by a non-privileged person by stripping away content and meaning from the document without human intervention such that only structural and/or grammatical information of the document are conveyed to the non-privileged person, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

An operation 402 may include receiving an electronic document including text conveying one or more confidential concepts. The text may include a plurality of words including a first word. Operation 402 may be performed by one or more hardware processors configured by machine-readable instructions including a module that is the same as or similar to document receiving module 308, in accordance with one or more implementations.

An operation 404 may include providing a content-stripped version of the electronic document to a human editor. The content-stripped version may include symbols substituted for content words such that content and meaning is stripped away from the document. The content and meaning may be stripped away without human intervention such that only structural and/or grammatical information of the document are conveyed to the human editor. Operation 404 may be performed by one or more hardware processors configured by machine-readable instructions including a module that is the same as or similar to version providing module 318, in accordance with one or more implementations.

An operation 406 may include receiving an edited content-stripped version of the electronic document. The edited version may include changes to the content-stripped version made by the human editor. Operation 406 may be performed by one or more hardware processors configured by machine-readable instructions including a module that is the same as or similar to version receiving module 320, in accordance with one or more implementations.

An operation 408 may include providing an edited electronic document based on the edited content-stripped version such that human-editor-provided changes were effectuated without the human editor ever being exposed to the content and meaning contained in the electronic document. Operation 408 may be performed by one or more hardware processors configured by machine-readable instructions including a module that is the same as or similar to document providing module 322, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to facilitate review of a confidential electronic document by a non-privileged person without exposing the non-privileged person to any confidential content or confidential meaning contained in the confidential electronic document, the system comprising:
- one or more hardware processors configured by machine-readable instructions to:
  - receive, at a processor, the confidential electronic document including text, the text including a plurality of words;
  - tokenize the text of the confidential electronic document by breaking up a stream of the text into tokens, a given token being a word or a punctuation;
  - determine whether individual tokens are individual content words, a content word having substantive meaning;
  - determine whether the individual tokens are individual function words, a given function word lacking the substantive meaning and instead denoting grammatical relationships between content words; and
  - substitute the individual tokens comprising the individual content words with different corresponding symbols, wherein a first character of an individual symbol is the same as a first character of an individual content word, wherein the substituting strips away the confidential content or the confidential meaning contained in the confidential electronic document, wherein a given symbol is substituted for every instance of a given content word in the text, wherein a correlation between the given symbol and the given content word is unique to the confidential electronic document such that other instances of the given content word in other confidential electronic documents have others ones of the different corresponding symbols.

2. The system of claim 1, wherein the non-privileged person is a person who is not affiliated in a confidential relation underlying a confidentiality of the confidential electronic document.

3. The system of claim 2, wherein the confidential relation includes an attorney and client, a husband and wife, a physician and patient, or a master and servant.

4. The system of claim 1, wherein the confidential electronic document is password protected and/or encrypted.

5. The system of claim 1, wherein all of the content words in the text are substituted with the different corresponding symbols.

6. The system of claim 1, wherein responsive to the determination that the individual tokens are the individual function words, leave the individual function words intact.

7. The system of claim 1, wherein a suffix of the individual symbol is the same as a suffix of the individual content word.

8. The system of claim 1, wherein the individual symbol includes a numeric portion, the numeric portion of the individual symbol being determined based on a random number or an order of appearance of the individual content word in the text.

9. A method to facilitate review of a confidential electronic document by a non-privileged person without exposing the non-privileged person to any confidential content or confidential meaning contained in the confidential electronic document, the method comprising:
- receiving, at a processor, the confidential electronic document including text, the text including a plurality of words;
- tokenizing the text of the confidential electronic document by breaking up a stream of the text into tokens, a given token being a word or a punctuation;
- determining whether individual tokens are individual content words, a content word having substantive meaning;
- determining whether the individual tokens are individual function words, a given function word lacking the substantive meaning and instead denoting grammatical relationships between content words; and
- substituting the individual tokens comprising the individual content words with different corresponding symbols, wherein a first character of an individual symbol is the same as a first character of an individual content word, wherein the substituting strips away the confidential content or the confidential meaning contained in the confidential electronic document, wherein a given symbol is substituted for every instance of a given content word in the text, wherein a correlation between the given symbol and the given content word is unique to the confidential electronic document such that other instances of the given content word in other confidential electronic documents have others ones of the different corresponding symbols.

10. The method of claim 9, wherein the non-privileged person is a person who is not affiliated in a confidential relation underlying a confidentiality of the confidential electronic document.

11. The method of claim 10, wherein the confidential relation includes an attorney and client, a husband and wife, a physician and patient, or a master and servant.

12. The method of claim 9, wherein the confidential electronic document is password protected and/or encrypted.

13. The method of claim 9, wherein all of the content words in the text are substituted with the different corresponding symbols.

14. The method of claim 9, wherein responsive to the determination that the individual tokens are the individual function words, leaving the individual function words intact.

15. The method of claim 9, wherein a suffix of the individual symbol is the same as a suffix of the individual content word.

16. The method of claim 9, wherein the individual symbol includes a numeric portion, the numeric portion of the individual symbol being determined based on a random number or an order of appearance of the individual content word in the text.

* * * * *